United States Patent [19]

Cail

[11] Patent Number: 5,255,165
[45] Date of Patent: Oct. 19, 1993

[54] BRAKE LIGHT ASSEMBLY

[76] Inventor: John M. Cail, 4415 W. Florence Campbellstown Rd., Eaton, Ohio 45320

[21] Appl. No.: 949,990

[22] Filed: Sep. 24, 1992

[51] Int. Cl.⁵ .......................................... B60Q 1/44
[52] U.S. Cl. .................................. 362/80.1; 362/249; 362/397
[58] Field of Search ............... 362/80.1, 61, 382, 397, 362/458, 227, 236, 249, 250; 340/467

[56] References Cited

U.S. PATENT DOCUMENTS

| | | | |
|---|---|---|---|
| 2,084,252 | 6/1937 | Hallenberg | 362/80.1 |
| 2,139,420 | 12/1938 | Richards | 362/80.1 |
| 2,190,123 | 2/1940 | Pace | 362/80.1 |
| 2,650,355 | 8/1953 | Pieczonka | 362/80.1 |
| 2,675,534 | 4/1954 | Bryant | 362/80.1 |
| 3,665,392 | 5/1972 | Annas | 362/80.1 |
| 5,099,401 | 3/1992 | Kondo et al. | 362/80.1 |
| 5,126,926 | 6/1992 | Chiang Wen | 362/80.1 |

Primary Examiner—Richard R. Cole
Attorney, Agent, or Firm—S. Michael Bender

[57] ABSTRACT

A brake light assembly in the form of a rectangularly shaped housing is adapted to be mounted on the inside surface of the front windshield of an automobile or similar vehicle. The assembly includes a reflective lens facing forward, a series of lamps configured in a column and mounted within the housing behind the lens, a power cord for attachment to the vehicle's conventional brake light circuit, and a pair of suction cups for affixing the assembly to the inside surface of the vehicle windshield. In an alternative arrangement, a flexible rim is provided on the anterior of the housing for blocking light leaks which might interfere with the driver's normal vision, and which furthermore, includes an activatable adhesive for affixing the housing rim to the inside surface of the windshield.

2 Claims, 4 Drawing Sheets

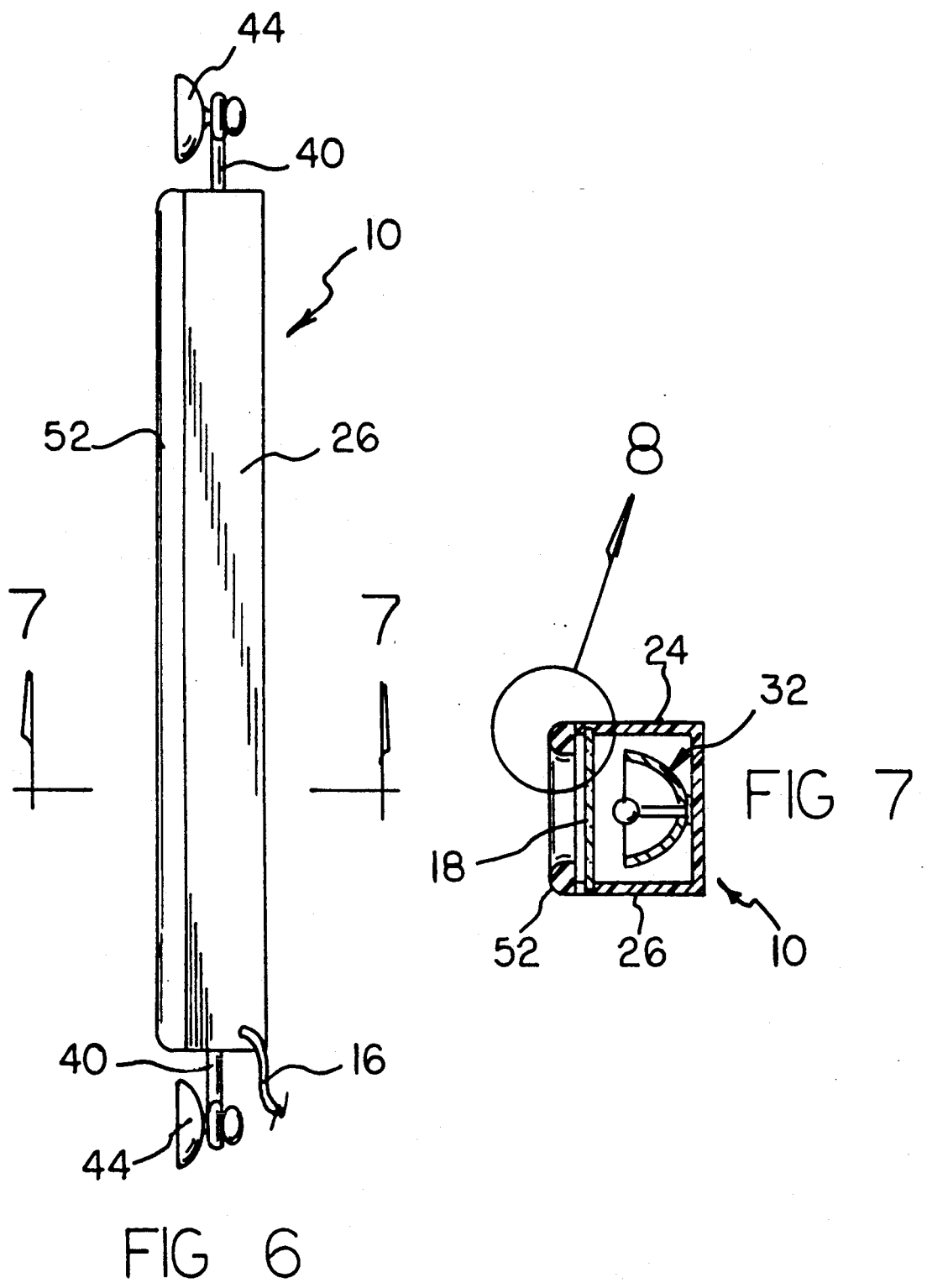

BRAKE LIGHT ASSEMBLY

BACKGROUND OF THE INVENTION

1. Field of the Invention

The present invention relates generally to vehicle brake light systems, and more particularly, to a brake light assembly especially adapted to be mounted on the inside surface of a vehicle windshield.

2. Description of the Prior Art

Auxiliary brake light systems for vehicles and the like generally are known. For example, U.S. Pat. No. 4,843,369 discloses a brake light housing mounted on the rear seat shelf behind the rear windshield. Similarly, U.S. Pat. No. 4,954,808 shows a light housing mounted on the rear shelf comprising three lamp sections connected to the right and left turn signal circuits and the brake light circuit of a vehicle, respectively. Indeed, "high mounted" rearward facing auxiliary brake lights are now required by Federal regulations governing the use of passenger automobiles in the United States.

No such regulations exist however with regard to "high mounted" auxiliary brake lights mounted on the front of a vehicle. Front facing brake lights have obvious advantages in terms of safety because they indicate to oncoming traffic the nature of driving action being taken, e.g. it would be extremely desirable if the drivers of cars approaching, say, an intersection would know if one or the other were braking. In U.S. Pat. No. 4,837,554 there is disclosed a vehicle signalling system comprising differently colored lights indicating the character of the motion of a vehicle. Thus, when the brake is depressed and the car still is in motion, "red" lights are flashed, whereas when the brake is depressed and the car is stopped "green" lights are flashed. The '554 Patent teaches that the motion indicating lights are mounted on the front of the automobile and on the sides thereof near the front, but do not disclose or suggest a "high" mounting. Likewise, U.S. Pat. No. 4,940,962 discloses an auxiliary light system for automobiles where the lights are responsive to depression of the vehicle and the vehicles speed. Here again however, although the lights are front mounted they are located at the bottom of the front bumper rather than being "high mounted."

It is clear from the foregoing that a need exists for a high mounted auxiliary brake light disposed or otherwise located on the front of a vehicle and visible to oncoming traffic. This need is met by the present invention as will be made evident from the following description thereof. Other advantages of the present invention over the prior art also will be rendered evident.

SUMMARY OF THE INVENTION

To achieve the foregoing and other advantages, the present invention, briefly described, provides a brake light assembly in the form of a rectangularly shaped housing is adapted to be mounted on the inside surface of the front windshield of an automobile or similar vehicle. The assembly includes a reflective lens facing forward, a series of lamps configured in a column and mounted within the housing behind the lens, a power cord for attachment to the vehicle's conventional brake light circuit, and a pair of suction cups for affixing the assembly to the inside surface of the vehicle windshield. In an alternative arrangement, a flexible rim is provided on the anterior of the housing for blocking light leaks which might interfere with the driver's normal vision, and which furthermore, includes an activatable adhesive for affixing the housing rim to the inside surface of the windshield.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will form the subject matter of the claims appended hereto.

In this respect, before explaining at least two preferred embodiments of the invention in detail, it is to be understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which this disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

Further, the purpose of the foregoing Abstract is to enable the U.S. Patent and Trademark Office and the public generally, and especially the scientists, engineers and practitioners in the art who are not familiar with patent or legal terms of phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

It is therefore an object of the present invention to provide a new and improved brake light assembly which has all of the advantages of the prior art arrangements and overcomes the disadvantages thereof.

It is another object of the present invention to provide a new and improved brake light assembly which may be easily and efficiently manufactured and marketed.

It is a further objective of the present invention to provide a new and improved brake light assembly of inexpensive and reliable construction.

An even further object of the present invention is to provide a new and improved brake light assembly which is susceptible of a low cost of manufacture with regard to both materials and labor, and which accordingly is then susceptible of low prices of sale to the consuming public, thereby making such brake light assembly available to the buying public.

Still yet a further object of the present invention is to provide a new and improved brake light assembly capable of being mounted on the front of a vehicle so as to be clearly visible to oncoming traffic.

Still yet a further object of the present invention is to provide a new and improved brake light assembly capable of being mounted on the inside surface of the front windshield of a vehicle.

Yet still another object of the present invention is to provide a new and improved brake light assembly capable of being mounted on the inside surface of the front windshield of a vehicle and having means for preventing the light issuing from the assembly from interfering witch the vehicle driver's normal vision.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawings wherein:

FIG. 6 is an enlarged side view of an alternative embodiment of the invention and specifically of the brake light assembly housing.

FIG. 7 is a cross-sectional view of the embodiment of FIG. 6 taken along line 7—7 of FIG. 6.

DESCRIPTION OF THE PREFERRED EMBODIMENT

With reference now to the drawings, a new and improved brake light assembly embodying the principles and concepts of the present invention will be described.

Figure 1:
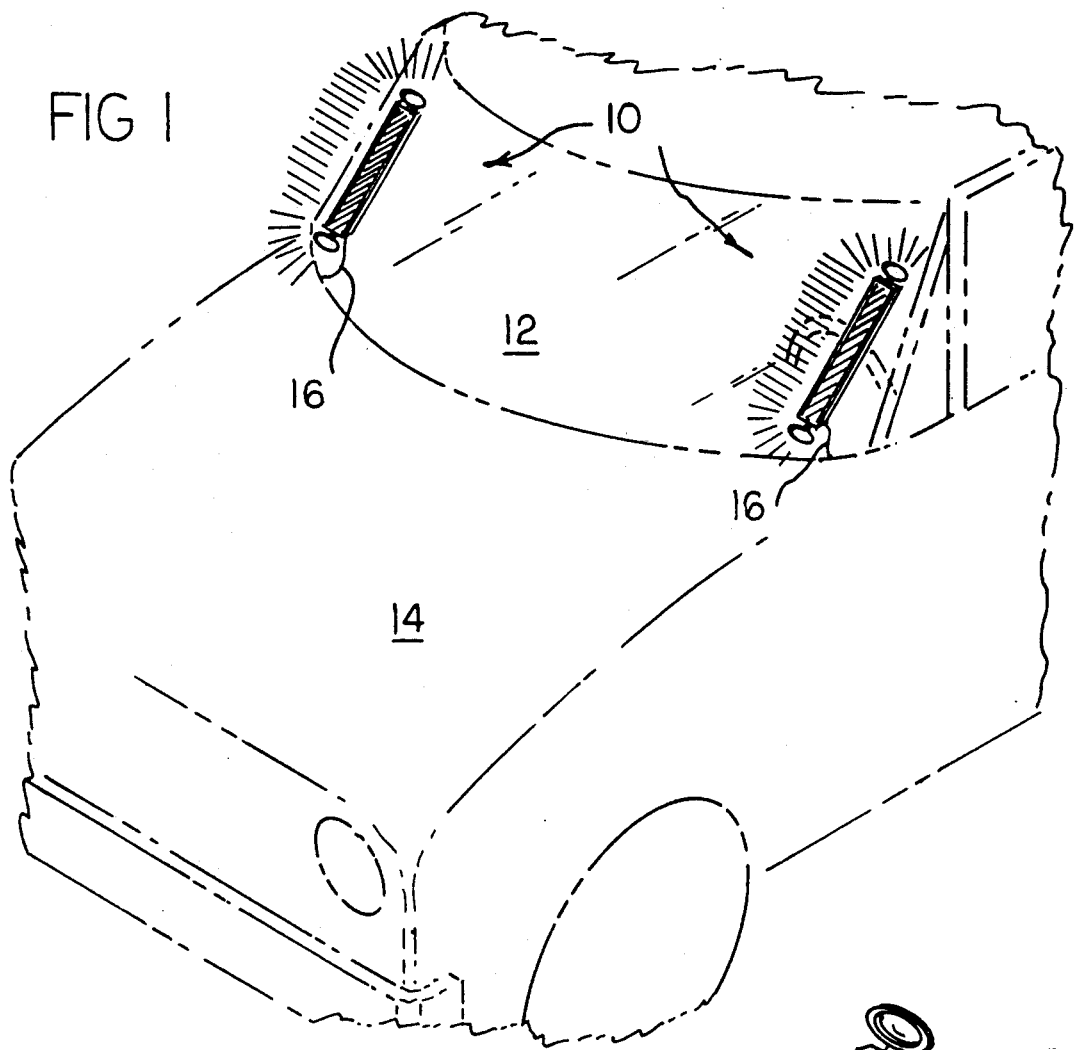
FIG. 1 is a perspective diagrammatic view showing the first preferred embodiment of the brake light assembly of the invention operatively positioned on the inside surface of an automobile windshield.
Figure 2:
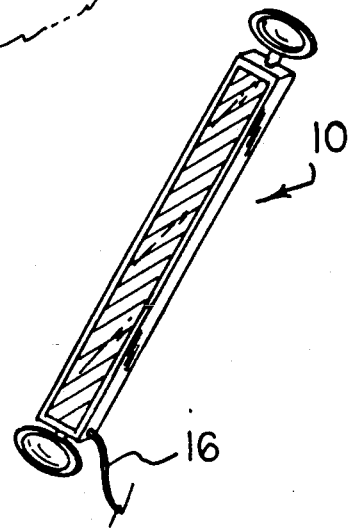
FIG. 2 is a perspective view in elevation of one of the brake light assembly housings of the present invention.

Turning initially to FIGS. 1 and 2, there is shown a first exemplary embodiment of the brake light assembly of the invention comprising a pair of housings generally designated by reference numeral 10 positioned substantially as shown on opposite lateral sides of the inside surface of the front windshield 12 of a vehicle 14. A power cord 16 for conveying electrical energy to the lamps inside housing 10 extend from the bottom of each housing and is suitably connected to the brake light circuit of the vehicle in a conventional manner. Thus, when the operator of vehicle 14 depresses the vehicle's brake pedal (not shown), the lamps inside each housing will illuminate and the light issuing from the housings 10 will clearly be visible to oncoming traffic or others viewing the front of the vehicle so that they will know the operator is braking the vehicle.

Figure 3:
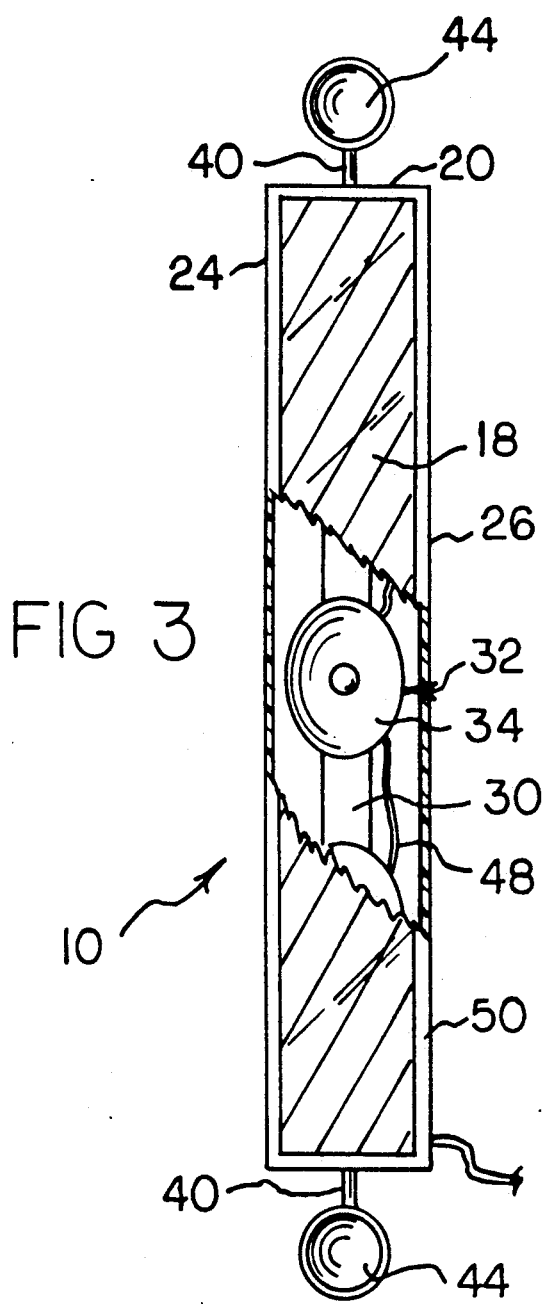
FIG. 3 is an enlarged from elevational view of the housing of FIG. 2 partially broken away.
Figure 4:
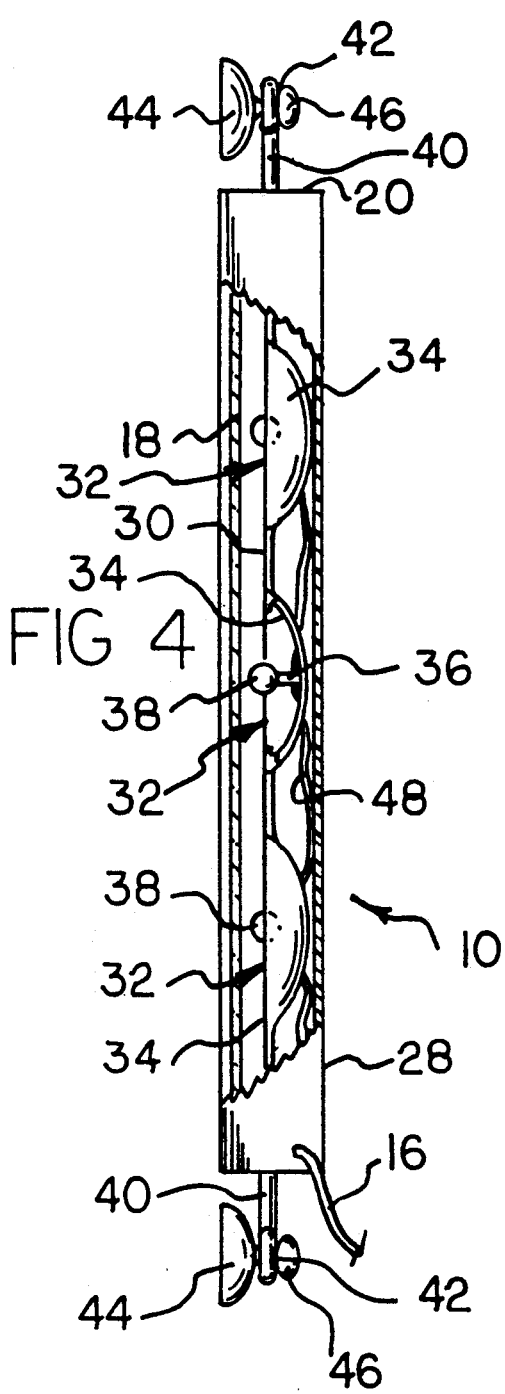
FIG. 4 is an enlarged side elevational view of the housing of FIG. 2 partially broken away.
Figure 5:
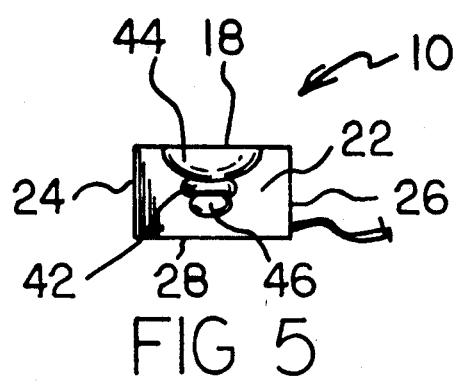
FIG. 5 is an enlarged top elevational view of the housing of FIG. 2.

Turning to FIGS. 3 through 5, the brake light housing according to the first exemplary embodiment of the invention comprises a generally rectangular enclosure having a front, transparent or translucent colored lens 18; opposed top and bottom end walls 20, 22; opposed left and right side walls 24, 26; and a back wall 28. The longitudinal dimension of the enclosure is substantially greater than its transverse dimension giving the housing a characteristic narrow or "strip-like" appearance as viewed, for example, in FIG. 3.

Disposed inside the enclosure is a mounting bracket 30 upon which are suitably affixed a series of lamp units each designated by reference numeral 32. The lamp units 32 preferably are evenly spaced with respect to each other and form a column substantially as shown. While the number of lamp units is a matter of choice, the preferred arrangement comprises three in number. Each lamp unit 32 is of conventional construction and may comprise the standard commercially available low-voltage type commonly used in automobile brake or other lighting systems. In this regard, each lamp unit 32 is provided with a parabolic reflector 34, a socket receptacle 36, and a suitable light bulb 38.

Extending from the top and bottom end walls 20, 22 and oppositely with respect to each other is a pair of brake light housing support or mounting posts each designated by reference numeral 40 and each of which terminates in an eyelet 42. A suction cup 44 of suitable rubber-like material has a rear nipple 46 captured in each eyelet, respectively.

Finally, an insulated electrical conductor 48 of the type used in automobile lighting systems is attached in series to lamp units 32 and exits the housing through a suitable grommet (not shown) whereupon the conductor may be spliced into and operatively connected to the vehicle's normal brake lighting circuit as will be understood by those of ordinary skill.

In use, a pair of brake light assemblies 10 according to the invention are mounted via suction cups 44 to the inside surface of the vehicle's front windshield proximal to the lateral extremities of the windshield and with the longitudinal axis approximately parallel to the windshield or "A" pillars of the vehicle substantially as shown. This preferred arrangement produces a pair of "high mounted" strip lights which are clearly visible to oncoming drivers or to pedestrians viewing the front or the sides of the vehicle near the front of same. Thus, when the operator of the vehicle having the brake light assemblies of the present invention mounted on the front windshield as disclosed steps on or depresses the vehicle's brake pedal, a clearly visible signal will be directed to the front of the vehicle indicating that the driver is applying the brakes of the vehicle.

In order to change any exhausted bulbs 38, the lamp units preferably may be accessed by providing a snap-fittable rim 50 peripherally fixed to the front lens 18. The rim and the front lens thus form a single unit which may be frictionally mounted on the enclosure in a suitable manner and be easily removed and replaced to facilitate changing bulbs. Front lens 18 preferably is fabricated of a molded light transmissive polymeric material as is well known in the art and may be given any desired color. However, the color "red" is preferred as this color is conventionally understood to represent "braking" or slowing of a vehicle. In addition, lens 18 may have formed therein any conventional optical enhancement elements such as, for example, cube-corner reflective elements, in any pattern desired.

Figure 8:
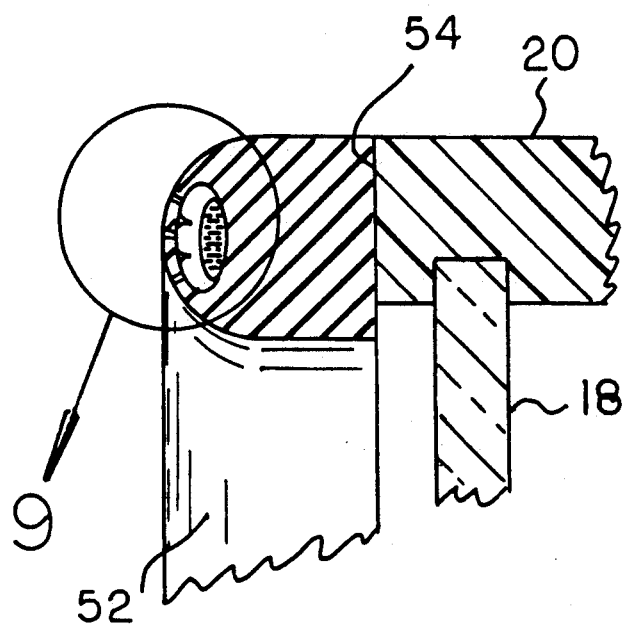
FIG. 8 is an enlarged detailed view in elevation of the portion of the embodiment of FIG. 7 encompassed by circle 8 therein.
Figure 9:
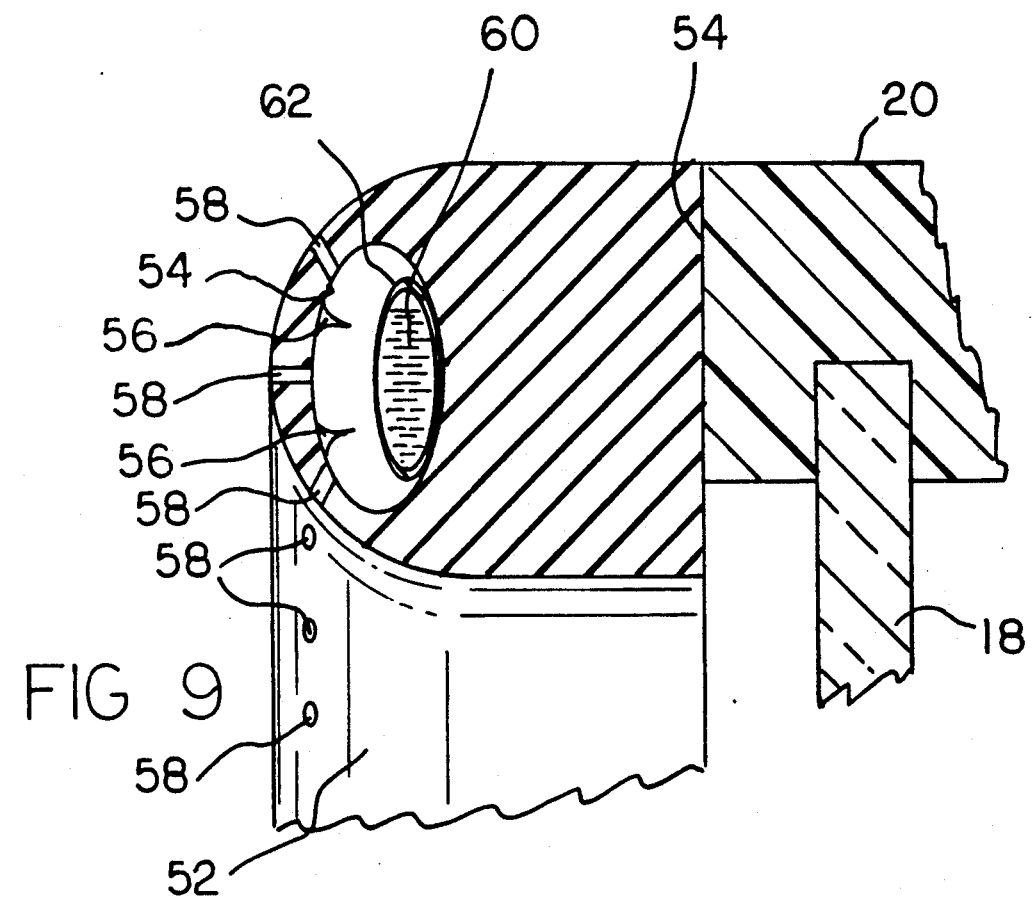
FIG. 9 is an enlarged detailed view in elevation of the portion of the embodiment of FIG. 8 encompassed by circle 9 therein.

Turning now to FIGS. 6 through 9, there is shown an alternative embodiment of the invention wherein the same parts are represented by like reference numbers. A rim 52 of flexible material, e.g. rubber or the like, is affixed to the enclosure in lieu of rim 50. Flexible rim 52 is suitably affixed to the front peripheral edge 54 of the top, bottom, and side walls as shown, and extends forwardly therefrom terminating at its distal extremity in a rounded or convex surface. Thus, as best seen in FIGS. 8 and 9, the cross-sectional shape of the outer portion of flexible rim 52 in a plane perpendicular to front lens 18 approximates that of a semi-circle. In accordance with the invention, a cavity 54 having an elliptical cross-sectional shape is formed in the rim 52 more or less concentrically with respect to the latter's semi-circular shaped portion and extends circumferentially throughout the entire circumferential extent of the rim. As shown to best advantage in FIG. 9, the outer wall defined by cavity 54 is provided with a circumferentially extending series of sharp projections 56 and three rows of circumferentially extending apertures or through holes 58 extending between the cavity 54 and the outer or distal surface of flexible rim 52 spaced substantially entirely about the entire circumferential extent of rim 52. Disposed within the cavity 54 is an encapsulated donut of a conventional fast-drying liquid adhesive 60 contained within a thin, pliable plastic sleeve 62 which is adapted to be readily punctured or perforated by projections 56 upon flexural compression of rim 52.

By the foregoing construction, the brake light housing assemblies 10 may be affixed in the desired position on the inside surface of the front windshield of a vehicle merely by pressing the housing and the rim 52 against the windshield surface, thereby compressing the flexible material of the rim, and holding it in place for a length of time sufficient to enable adhesive 58 to flow through passages 58 and to dry or set up. It is apparent that pressure against the windshield surface causes the rim to compress to the right as viewed in FIG. 9, so that in turn, the sharp projections 56 puncture the encapsulating sleeve 62 thereby causing the liquid adhesive to flow through passages 58 and contact the windshield surface. It will thus be appreciated that the action of pressing the brake light assembly against the windshield surface with flexible rim 52 engaging the windshield surface automatically releases the adhesive in cavity 54 and provides means for semi-permanently attaching the brake light assembly to the windshield surface in the desired location thereon.

Moreover, in accordance with another important feature of the invention, the flexible rim 52 because of the shape of its convex distal edge portion, its disposition completely circumferentially surrounding lens 18, and its flexible character, enables it when affixed to the windshield surface to form an extremely tight and effective light seal peripherally surrounding lens 18 and thereby preventing illumination from the energized lamp units from leaking laterally beyond the front surface of lens 18 and distracting or otherwise interfering with the vehicle operator's normal path of vision through the windshield, i.e. the driver does not pick up annoying flashes of red in the corners of the eyes when he or she steps on the brake pedal.

It is apparent from the above description that the present invention accomplishes all of the objectives set forth by providing a new and improved brake light assembly that is capable of being "high mounted" on the inside surface of a vehicle windshield and that is low in cost, and relatively simple in design and operation, thereby providing a readily available auxiliary brake light assembly visible at the front of the vehicle.

With respect to the above description, it should be realized that the optimum dimensional relationships for the parts of the invention, to include variations in size, materials, shape, form, function and manner of operation, assembly and use, are deemed readily apparent and obvious to those skilled in the art, and therefore, all relationships equivalent to those illustrated in the drawings and described in the specification are intended to be encompassed only by the scope of appended claims.

While the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein. Hence, the proper scope of the present invention should be determined only by the broadest interpretation of the appended claims so as encompass all such modifications and equivalents.

What is claimed as being new and desired to be protected by Letters Patent of the United States is as follows:

1. A new and improved brake light assembly for a vehicle comprising:

a housing, said housing having a light transmitting lens, illumination means in said housing, conductor means adapted to be connected between said illumination means and a brake light circuit of said vehicle, and means for mounting said housing on a front windshield inside surface of said vehicle, wherein said mounting means comprises a rim of flexible material peripherally surrounding said light transmitting lens, said rim having a hollow space therein, passage means between said hollow space and an exterior of said rim, encapsulated liquid means in said hollow space, and puncture means for perforating said encapsulation and causing said liquid adhesive to flow through said passage means upon flexure of said rim.

2. A new and improved brake light assembly for a vehicle comprising:

a pair of housings, each said housing having a light transmitting lens, illumination means in said housing, conductor means adapted to be connected between said illumination means and a brake light circuit of said vehicle, means for mounting each said housing on a front windshield inside surface of said vehicle, wherein said illumination means comprises a series of individual lamp units mounted inside each said housing and being wired in series with said conductor means, and wherein each said housing is rectangularly shaped and has a major elongated extent defined by a longitudinal axis of the housing, and said lamps units are mounted in each said housing one above another along said longitudinal axis to form a column such that said pair of housings are adapted to be affixed to the front windshield of said vehicle with the longitudinal axis of each housing being positioned orthogonal to a transverse extent of said windshield and with each said housing in said pair being located proximal to opposed side edges of said windshield, respectively.

* * * * *